Patented Oct. 20, 1925.

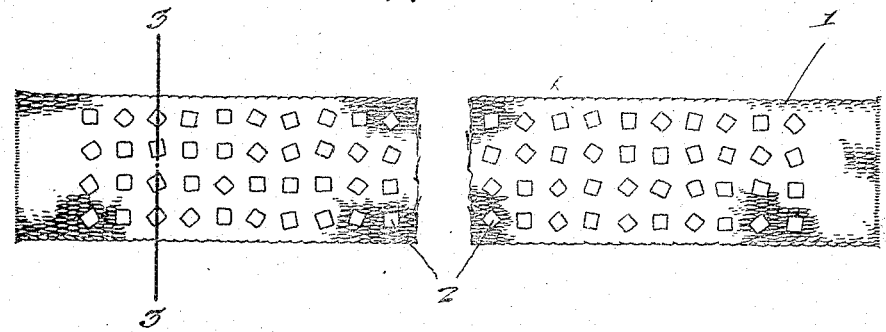
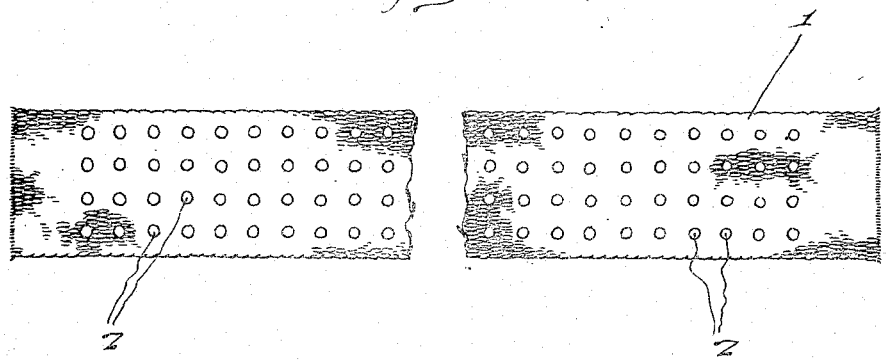
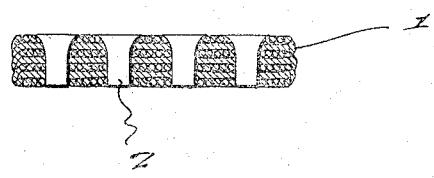

1,558,408

UNITED STATES PATENT OFFICE.

ARTHUR G. SORLIE, OF GRAND FORKS, NORTH DAKOTA.

LINING.

Application filed May 11, 1923. Serial No. 638,320.

*To all whom it may concern:*

Be it known that I, ARTHUR G. SORLIE, a citizen of the United States, residing at Grand Forks, in the county of Grand Forks and State of North Dakota, have invented new and useful Improvements in Linings, of which the following is a specification.

This invention relates to a lining for clutch bands, brake bands and the like, the general object of the invention being to provide means for increasing the gripping action of the lining and also prolonging the life thereof.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of one side of the improved lining.

Figure 2 is a view of the opposite side.

Figure 3 is a section on line 3—3 of Figure 1.

As shown in these views the lining 1 is provided with inserts 2 which are preferably made of wood. The ends of these inserts are flush with the surfaces of the lining so that they will increase the gripping action and also reduce wear of the lining. These inserts may be made in the form of pegs and driven through the lining with their ends cut off flush with the surfaces of the lining or they may be inserted in any other suitable manner. A lining constructed in accordance with this invention will wear longer, clutch tighter and release quicker than linings as now made. The lining can be composed of any suitable fabric, such as that used for brake linings now on the market. As shown in Figure 3, the pegs are provided with heads which are formed by driving the pegs into the lining so that when the face of the lining on which the heads are located is used the gripping action will be increased.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lining of the class described having wooden inserts therein which pass entirely through the lining and having their ends flush with the surfaces of the lining, said inserts having enlarged heads which are arranged at one face of the lining.

In testimony whereof I affix my signature.

ARTHUR G. SORLIE.